Patented Mar. 2, 1937

2,072,085

UNITED STATES PATENT OFFICE 2,072,085

PROCESS FOR BREAKING EMULSIONS

Melvin De Groote, St. Louis, and Bernhard Keiser, Webster Groves, Mo., assignors to Tretolite Company, Webster Groves, Mo., a corporation of Missouri No Drawing. Application February 17, 1936, Serial No. 64,350

20 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by our process consists of or comprises a sulfosuccinic acid body of the kind hereinafter described, in the form of an acid, or a salt, or an ester. The word "ester" will be herein employed to refer broadly to a sulfosuccinic acid body, in which any one of the acidic hydrogen atoms are replaced by a radical derived from an alkyl, aryl, cyclic, hydroaromatic, or aralkyl alcohol, or the like. Even though such an ester may have a free acidic hydrogen, or may have a salt-form radical, such as a sulfonic hydrogen or carboxyl hydrogen, replaced by a metal or an ammonium radical or amine residue, even so, it will be considered as a sub-species of the ester form and as belonging to the ester species and not as belonging to the acid species or salt species. The expression "sulfosuccinic acid body in the form of an acid", is herein used to denote a material containing a free acidic hydrogen, but not containing an ester radical of the kind previously described. Likewise, the expression "sulfosuccinic acid body in the form of a salt" is herein used to denote a material containing at least one radical in the form of a salt, but not containing any ester radical of the kind previously described. The presence of an ester radical, even if a salt-form radical and a free acid radical be present, is intended to clearly characterize the material as being in the ester class.

We have found that the esters of sulfosuccinic acid yield the most effective demulsifying agents in the majority of instances, as compared with ester-free salts or acids. The reason for this statement can be readily understood. The most valuable demulsifying agents are generally characterized by the presence of both a hydrophobe and a hydrophile residue in the molecule. The hydrophile residue is usually ionogenic. This is true in the case of oleic acid, sulfo-oleic acid, petroleum sulfonic acids, alkylated aromatic sulfonic acids, substituted tri-ricinolein, in which at least one alcoholiform hydroxyl has been replaced by a di-basic carboxy acid residue containing a free carboxyl, sulfo-aromatic fatty acids, etc. Succinic acid has only two carbon atoms, excluding the carboxyl carbon atoms. Thus, it naturally is very soluble in water. Hence, the introduction of a sulfo group in addition yields a product which is even more soluble, and as a result, there is absolute freedom from the hydrophobe-hydrophile balance so characteric of many demulsifying agents. This balance is related to orientability at oil-water interfaces, or at water-emulsifier interfaces, or oil-emulsifier interfaces.

Sulfosuccinic acid or its salts may break some oil field emulsions for reasons other than the properties exemplified by hydrophobe-hydrophile balance, as, for example, its free acidity, possibly certain electrical effects, etc. Similarly, soluble salts of succinic acid may also be somewhat effective as demulsifying agents, for the reason that salts within the terminology above applied will include acid salts. The term "salts" is intended to include ammonium salts, amine salts, substituted ammonium salts, etc., as well as the customary metallic salts. It is perfectly obvious that if one or more hydrogens of sulfosuccinic acid is neutralized with an amine having a rather high molecular weight, as, for example, aniline, toluidine, xylidine, methyl aniline, di-methyl aniline, ethyl aniline, di-ethyl aniline, benzylamine, etc., one confers upon the compound a hydrophobe-hydrophile balance which endows the compound with effective demulsifying properties, much in excess of the ordinary tri-basic acid, or the ordinary metallic salts. Naturally, aliphatic amines, such as propyl amine, butyl amine, amyl amine, di-amylamine, tri-amylamine, and also pyridine, and similar materials may be used. Octyl amines, etc., are just as suitable. In view of the fact that many of the amines, particularly the higher aliphatic amines, are rather expensive, it is preferable to obtain the hydrophobe-hydrophile balance by esterification, insofar that esters of the carboxylic hydrogens present in sulfosuccinic acid are obtained with considerable ease. Therefore, the most desirable application of the present process will be found by means of a compound containing at least one ester group.

Although it is presumable that succinic acid can be sulfonated in the manner applied to other low molecular weight aliphatic acids, such as acetic acid, to produce a sulfo derivative, yet this is unnecessary. It is more convenient to produce an acid salt of sulfosuccinic acid in which the sulfonic acid radical is neutralized and the carboxylic acid radicals are unneutralized. Such a material is readily obtainable by reaction between maleic acid or a compound thereof and a bisulfite.

Bisulfites, as well as sulfites in some instances, combine with various materials, such as aldehydes, ketones, etc. to form sulfonates or hydroxy sulfonates. Reactions of this general class are described in U. S. Patent No. 2,026,219, dated December 31, 1935, to Melvin De Groote and Bernhard Keiser. The reaction with aldehydes and ketones probably is concerned with the opening up of the double bond between the carbon atom and the oxygen atom. When reaction takes place with a material such as linseed oil, in the absence of an oxidizing agent, the probable explanation may be that the ethylene linkage, i. e., the double bond between two carbon atoms, may open up and become saturated with a $NaSO_3$ residue, and the hydrogen atom in the same manner as if sulfuric acid were added with the addition of a $HSO_4$ radical and a hydrogen atom. Probably, for similar reasons, reactions take place readily between a bisulfite and maleic acid, to form sulfosuccinic acid. Chlorsuccinic acid would react just as readily to produce sulfochlorsuccinic acid, but there appears to be no good reason for using such more expensive reagent, which is only the chemical equivalent. Instead of maleic acid, any other unsaturated, low molecular weight, aliphatic, dibasic, carboxy acid could be employed as fumaric acid, which is an isomer of maleic acid. Glutaconic acid may be employed instead of maleic acid, although obviously there would be no justification for the use of such more expensive reagent. Herein reference will be made to maleic acid specifically, because at the moment it is the only low priced, unsaturated, polybasic, carboxy acid available, although in view of what has been said, obviously some other acid might be produced which would be the obvious equivalent for this particular purpose, i. e., it might be of reasonably low molecular weight, be unsaturated so as to combine with a bisulfite, and would have at least two carboxyl groups. Any such acid which is available could obviously be employed as the chemical equivalent of maleic acid, without experimentation or without further effort. The resultant product would not be sulfosuccinic acid, but would be a homologue or isologue thereof, which would be the chemical equivalent for the present purpose. Maleic acid is often used more conveniently in reactions as the anhydride.

In many instances it is easier to subject an ester of maleic acid to a bi-sulfite reaction, and to subsequently obtain the desired product in a pure form, than it is to form the sodium salt of sulfosuccinic acid and then produce the corresponding ester. For example, maleic acid may be esterified with two moles of hexyl alcohol to yield di-hexyl maleate. The purified di-hexyl maleate may be re-acted with a molecular proportion of sodium bi-sulfite until complete reaction takes place. After the reaction has been completed, the material is carefully dried, after which it may be dissolved in any suitable inorganic solvent and filtered so as to eliminate the inorganic salts. Instead of sodium bi-sulfite, obviously potassium or ammonium bi-sulfite could be employed. In some instances sulfur dioxide gas may be reacted jointly in the presence of a base, and such a base need not be a metallic carbonate or hydroxide, but may be an amine, such as tri-ethanolamine, amylamine, di-amylamine, benzylamine, etc. If a true organic bisulfite were available, then presumably such a material might be employed as satisfactorily as an inorganic bi-sulfite.

If sulfosuccinic acid is available by sulfonation of succinic acid, then it might be possible to produce an ester of the type in which the solfonic hydrogen was replaced by an alkyl or aryl radical, or equivalent group of the kind previously mentioned. Such reactions are usually rather difficult to conduct, because a sulfonic acid usually must be changed into a sulfon chloride and then reacted with a suitable aliphatic or aromatic alcohol or other alcohol. However, there does not appear to be any advantage to justify the employment of such more expensive reagent. For practical purposes it has been found most desirable to employ a sulfosuccinic acid body in which the sulfonic hydrogen is preferably replaced by a metal, such as sodium or potassium, or an equivalent group, such as an ammonium radical or amine radical. Since the sulfonic acid hydrogen is corrosive, the practical application of the present process is limited, largely, to the carboxyl ester type with the sulfonic radical in a salt form.

Maleic acid may be esterified with any one of a number of alcohols or combinations of alcohols, including the following: Mono-hydric alcohols, such as propyl alcohol, butyl alcohol, amyl alcohol, hexyl alcohol, octyl alcohol, decyl alcohol, duodecyl alcohol, stearyl alcohol; unsaturated mono-basic alcohols, such as oleyl alcohol; polyhydric alcohols, such as glycols, ethylene glycol, for example, glycerol, polyglycerols, etc.; ether alcohols, such as di-ethylene glycol butyl ether, etc.; polyhydric alcohols having at least one remaining free hydroxyl, in which one or more hydroxyl has been previously reacted with a suitable acid, such as mono-ricinolein, di-ricinolein, mono-stearin, mono-olein, or the equivalent bodies derived from polyglycerols; acid alcohols, such as hydroxy stearic acid, ricinoleic acid, polyricinoleic acid, tri-ricinolein, etc.; polyhydric alcohols, in which one or more di-basic carboxy acid residues have been introduced, such as a phthalic acid residue, a maleic acid residue, an oxalic acid residue, etc. (such polyhydric alcohol bodies may be employed, providing a free hydroxyl remains); cyclo-alcohols, such as cyclobutanol, etc.; aromatic alcohols, such as phenol, cresol, xylenol, naphthol, etc.; aralkyl alcohols, such as benzyl alcohol; heterocyclic alcohols, such as furfuryl alcohol, etc.; mixed isomer forms of the various alcohols, such as mixed amyl alcohols, etc.

More than one alcohol residue may be introduced in various manners, and in such event they need not be derived from the same source, but may represent the similar alcohols derived from the same class or from dissimilar classes. Under certain circumstances alkylene oxides, such as propylene oxide, butylene oxide, ethylene oxide, may be used in the place of alcohols. Certain alcohols derived from terpene bodies may be employed. In some instances the formation of the acid need not be by the usual steps of esterification, but the alcohol may be changed into a reactive halide in which a labile halogen replaces the hydroxyl of the alcohol. Such halide may be reacted with the selected acid, such as a carboxyl of sulfosuccinic acid mono salt, so as to yield the desired ester. In other cases the reaction may take place between the carboxyl hydrogen and a chlorhydrin derived from glycerol, or a similar chlorhydrin derived from some other polyhydric alcohol, such as di- or tri-glycerol, ethylene glycol, etc.

In the various examples and illustrations herein included, no effort is made to differentiate between isomers. In some instances it is perfectly obvious that more than one isomeric form may exist, and that the product obtained in commercial practice would be a mixture of isomers. One isomer is as acceptable as another, and it is not intended to differentiate between them.

Insofar that such a wide variety of materials may be produced, it is desired to point out general rules which may be followed as being helpful in producing the most effective and most suitable demulsifying agents from sulfosuccinic acid bodies. The following approximations will serve as valuable guides:

(a) If the sulfosuccinic acid body is water-soluble and combines with soluble calcium and magnesium salts to produce a precipitate, a very effective demulsifying agent is obtained;

(b) If the sulfosuccinic acid body is either water-soluble or water-insoluble, but does not react with calcium and magnesium salts to produce a precipitate in its state as employed, it should then be examined, after complete saponification with an excess of aqueous caustic soda or alcoholic potash. If such saponification liberates a material formerly combined in somewhat different form, as, for example, potassium stearate, sodium oleate, sodium naphthenate, potassium abietate, potassium ricinoleate, sodium hydroxy-stearate, sodium salt of tri-propylated naphthalene sulfonic acid, potassium salt of petroleum sulfonic acids, etc., then and in that event an effective reagent is obtained, even though the material did not happen to exhibit water softening properties until after saponification, or after alteration or decomposition, and then saponification. For purposes of classification, we will hereinafter refer to such class of compounds as described under rules (a) and (b) as the water softening type;

(c) The hydrophobe type of material is generally more effective than the extremely hydrophile type of material, i. e., between two compounds, one of which is soluble in water only, and the other which is soluble in oil and water, usually the type that is soluble in both oil and water is more effective, or in selecting between classes of materials which exhibit oil and water solubility and those which exhibit oil solubility only, or at least soluble in some hydrophobe solvent, such as propyl alcohol, propyl ether, benzol, etc., the latter type is more apt to be effective;

(d) In many instances the most valuable type of reagent is one which exhibits substantially no solubility, or at least a very limited solubility, in either water or in ordinary petroleum hydrocarbon solvents, such as straight run paraffinic gasoline, or straight run paraffinic kerosene. Thus, for example, as between two classes, one of which is extremely soluble in water, for example, and the other which is insoluble in water and insoluble in straight run paraffinic kerosene, the latter is usually more effective; and (e) Generally speaking, it is desirable that the reagent be of moderate molecular weight, based on unpolymerized material. Sometimes complex organic compounds are designated by a formula within the parentheses, followed by the sub letter $n$ to indicate a polymerized form. Reference to molecular weight is made solely to the unpolymerized form, based on composition or formula and not on physical methods of measuring the molecular weight. For instance, the sodium salt of sulfosuccinic acid di-methyl ester has a rather low molecular weight. This is also true of the sodium salt di-ethyl ester. Such materials which are of extremely low molecular weight, i. e., under 270, for example, are not as desirable or effective as reagents of higher molecular weight. On the other hand, if a mole of maleic acid is combined with two moles of di-ricinolein, and then with a mole of sodium bi-sulfite, one begins to obtain a material having a molecular weight of approximately 2300. If the molecular weight of such material is further increased by esterifying with di-basic acids, such as phthalic acid by combination with the free hydroxyls of the tri-ricinolein residues, one may obtain a compound whose molecular weight approximates 2700. These may be considered as the upper limit of the most effective compounds. Generally speaking, it is desirable to select derivatives within the molecular weight range of 270–2700, with about 300 to 1700 as the general optimum range.

It is to be noted that some of the most effective reagents obtainable for the purpose of demulsifying crude oil and derived from sulfosuccinic acid may be hydrophobe in character and substantially unsuited for purposes for which many conventional wetting agents are intended. For example, some of the water-insoluble products subsequently described are entirely devoid of the properties which are absolutely essential to a wetting agent.

For the sake of convenience, it may be desirable to refer to the salts of sulfosuccinic acid by specifying the metallic atom of the radical which replaces the sulfonic hydrogen first, and then specifying the groups that are combined with a carboxylic hydrogen. Thus, the example in which hexyl alcohol is esterified with maleic acid and then treated with sodium bi-sulfite, as previously referred to, will be described as sodium salt of sulfosuccinic acid, di-hexyl ester. In event that only one hexyl alcohol had been combined with maleic acid to leave a free hydroxyl radical, the material may be referred to as sodium salt sulfosuccinic acid, mono-hexyl acid ester.

In the following examples of methods for making suitable and effective reagents or demulsifiers, the reactions involved take place in obvious molecular proportions, unless specified to the contrary. In some instances obviously two molecules of one substance, or three molecules of one substance may react with one molecule of another substance. Since reactions are generally hastened by the excess of one of the reacting substances, it is usually desirable to use the most inexpensive reacting substance in slight excess. Since the bi-sulfite, particularly sodium bi-sulfite, is relatively cheap, it is generally desirable to use it in slight excess. Some of the reactions take place readily at relatively low temperature, for instance, 40 to 50° C., whereas, other substances may not react, except at a temperature approaching the boiling point of water, and in some instances, 140 to 160° C. must be employed and the reaction may require 4 to 20 hours. In other instances, the presence of an inert solvent, particularly if more than one of the reacting substances are present in the inert solvent, may be employed with subsequent removal of the solvent. Similarly, in some instances, reaction takes place under pressure varying from 2 to 6 atmospheres, gauge pressure. In other instances, the reactions are hastened by intimate and violent agitation. All the various reactions referred to are well known and a matter of common knowledge. In many instances it is desirable to employ maleic anhydride for esterification, instead of maleic acid. Inorganic salts may often be removed from the finished product by extracting the organic compound with a suitable organic solvent. The precipitation of common salt from an amine chloride and a sodium salt, or from a chlorhydrin and a sodium salt, is often hastened by presence of an alcohol, particularly a higher alcohol.

Example I

The sodium salt of sulfosuccinic acid di-hexyl ester is produced in the manner previously indicated.

Example II

Di-octyl maleate is prepared and reacted with tri-ethanolamine in the presence of water and sulfur-dioxide, with continued passage of sulfur dioxide until the tri-ethanolamine salt of sulfosuccinic acid di-octyl ester is formed.

Example III

Cocoanut oil fatty acid alcohols, i. e., the mixed alcohols obtained by converting the fatty acids of cocoanut oil into alcohols, are reacted with maleic acid to give the corresponding ester, which is then reacted with monoamylamine in presence of sulfur-dioxide in water, as in Example II, above.

Example IV

One mole of monochlorhydrin from glycerol is reacted with one mole of sodium stearate to yield monostearin. The two free hydroxyls are then combined with maleic acid in molecular proportion to give the neutral ester. This product is then reacted with potassium bi-sulfite in molecular proportion, or in presence of a slight excess of bi-sulfite.

Example V

Sodium stearate, in Example IV, is replaced by sodium oleate and the potassium bi-sulfite is replaced by ammonium bi-sulfite.

Example VI

Sodium stearate, in Example IV, is replaced by sodium ricinoleate and potassium bi-sulfite is replaced by sodium bi-sulfite.

Example VII

Sodium stearate, in Example IV, is replaced by sodium abietate.

Example VIII

Sodium stearate, in Example X, is replaced by sodium naphthenate and potassium bi-sulfite is replaced by sodium bisulfite.

Example IX

Water-soluble petroleum sulfo acids derived from "green" acids, are converted into the corresponding sulfon chloride by action of phosphorous pentachloride and then reacted with glycerol to form the corresponding di-basic ester. The product thus formed is reacted with maleic acid and then finally with potassium bi-sulfite in a manner analogous to Example IV.

Example X

Oil and water-soluble petroleum sulfo acids derived from "mahogany" acids are treated in the same manner as indicated in Example IX.

Example XI

Mono-butylnaphthalene beta sulfonic acid is converted into a sulfon chloride and reacted with glycerol to give the corresponding di-basic ester. This product, so obtained, is reacted with maleic acid and then with sodium bi-sulfite in the manner previously described.

Example XII

Glycerol, in Example XI, is replaced by di-glycerol.

Example XIII

Tri-isopropyl naphthalene sulfonic acid is converted into the sulfon chloride and reacted with tri-glycerol, and the product thus obtained further reacted with maleic acid and then with sodium bi-sulfite, as in Example XI.

Example XIV

Tri-glycerol, in Example XIII, is replaced by di-ethylene glycol, and maleic acid is replaced by mono-octyl ester of maleic acid and the reaction is completed with sodium bi-sulfite, as before.

Example XV

The mono-octyl ester of maleic acid employed in Example XIV is replaced by sodium acid maleate.

Example XVI

Any of the materials of the type obtained as final products, in Example V or VI, are subjected to sulfonation at low temperatures, for example, minus 5 to plus 5° C., with sulfuric acid monohydrate, washed after sulfonation with cracked ice, separated in the conventional manner, and neutralized with any suitable base, such as ammonium hydroxide, ammonium carbonate, sodium hydroxide, sodium bicarbonate, potassium carbonate, amylamine, triethanolamine, etc.

Example XVII

One mole of monoamyl ester of phthalic acid (acid amyl phthalate) is united with one mole of glycerol, and the two residual hydroxyls combined with maleic acid, after which the neutral ester thus obtained is treated with sodium bi-sulfite, as in prior examples.

Example VIII

Two moles of tri-ricinolein (castor oil) are treated with three moles of maleic acid to form a neutral ester, which is then treated with three moles of sodium bi-sulfite in the manner previously described.

Example XIX

Two moles of tri-ricinolein (castor oil) are treated with one mole of phthalic acid and two moles of maleic acid until a neutral ester is formed, after which the product is treated with two moles of sodium bi-sulfite in the manner previously described.

Example XX

Two moles of tri-ricinolein (castor oil) are treated with one mole of oxalic acid and two moles of maleic acid to form a neutral ester, after which the mass is then treated with two moles of sodium bi-sulfite, as before.

Example XXI

Two moles of tri-ricinolein (castor oil) are treated with three moles of maleic acid to form a neutral ester, which is then treated with two moles of sodium bi-sulfite, so that one mole of maleic acid residue is not converted into a sulfosuccinic acid residue, but the other two maleic acid residues are so converted.

Example XXII

Xylene sulfonic acid, is converted into the sulfon chloride, and reacted with glycerol, as in Example IV, to give the dibasic ester. This ester is reacted with maleic acid, and then with sodium bisulfite, as in prior examples.

In preparing the various reagents above described, certain monocarboxy, detergent-forming acids, such as the higher fatty acids, naphthenic acids, or abietic acids, are employed. These materials are characterized by the fact that they combine with alkalies, such as caustic soda, caustic potash, etc. to produce soap-like bodies. Hereinafter they will be referred to as detergent-forming, monocarboxy acids.

Previously reference has been made to the introduction of a residue derived from butyl naphthalene sulfonic acid, tri-isopropyl naphthalene sulfonic acid, xylene sulfonic acid, or the like, into a molecule along with a sulfosuccinic acid residue. It is to be noted that other alkylated mono-cyclic or poly-cyclic acids may be employed, such as cymene sulfonic acid, cresol sulfonic acid, di-amyl naphthalene di-sulfonic acid, monohexyl naphthalene sulfonic acid, dibutyl anthracene sulfonic acid, etc. High molecular weight alcohol sulfonic acid or sulfates, such as sulfo-cetyl alcohol, sulfo palmityl alcohol, etc. may be used in place of various alkylated aromatic sulfonic acids.

The reagent employed in our present process may be characterized by the presence of a sulfosuccinic acid residue of the following type formula in the molecule:

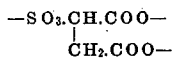

and said molecule is preferably within the molecular weight range of 270-2700, and is most advantageously characterized by water softening properties, at least, after complete saponification. The water softening properties are preferably due to the presence of a monocarboxy, detergent-forming acid radical, or to a sulfonic acid radical derived from polycyclic, aromatic, sulfonic acids or petroleum sulfonic acids.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc. may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or 1 to 30,000, such an apparent insolubility in oil and water is not significant, because said reagents undoubtedly have solubility within the concentration employed. This same fact is true in regard to the material or materials employed as the demulsifying agent of our process.

In practising our process, a treating agent or demulsifying agent of the kind above described is brought into contact with or caused to act upon the emulsion to be treated in any of the various ways, or by any of the various apparatus now generally employed to resolve or break petroleum emulsions with a chemical reagent, or may be employed co-jointly in combination with other non-chemical processes intended to effect demulsification.

It is again emphasized that sulfosuccinic bodies employed in the present process may be divided into three species, i. e., acids, salts and esters. For convenience, forms exhibiting both an ester form, and a salt form, or both an ester form and an acid form, or even an ester form, a salt form and an acid form, depending upon how each of the three acidic hydrogens are replaced, will be classified as sub-species of the ester species, and not as sub-species of the salt species, or of the acid species. In other words, the presence of one ester radical clearly identifies the product as belonging to the ester division, regardless of the status of the other two acidic hydrogens or other equivalents. Furthermore, in the claims, where a certain particular sub-species of the ester species is referred to as being "characterized by the presence of a metallic atom in the sulfonic hydrogen position", it is understood that the expression "metallic atom" includes the obvious equivalents previously referred to, to wit, the ammonium radical, substituted ammonium radical, and various amines, both aliphatic and aromatic, which combine an ordinary inorganic acid to form salts usually comparable to the alkali salts.

Having thus described our invention, what we claim as new and desire to secure by Letters Patent is:

1. A process for breaking a petroleum emulsion of the water-in-oil type which consists in subjecting the emulsion to the action of a demulsifying agent comprising a chemical compound of the formula type:

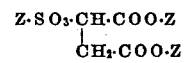

in which Z represents an ionizable hydrogen atom, a metallic atom, an ammonium radical, a substituted ammonium radical, or an organic radical obtained by dehydroxylation of an alcoholiform hydroxyl-containing organic compound.

2. A process for breaking a petroleum emulsion of the water-in-oil type which consists in subjecting the emulsion to the action of a demulsifying agent comprising a chemical compound of the formula type:

in which Z represents an ionizable hydrogen atom, a metallic atom, an ammonium radical, a substituted ammonium radical, or an organic residue obtained by dehydroxylation of an alcoholiform hydroxyl-containing organic compound, and being further characterized by the fact that the selection of Z at its various occurrences is such as to bring the molecular weight of the chemical compound within the range of 270–2700.

3. A process for breaking a petroleum emulsion of the water-in-oil type which consists in subjecting the emulsion to the action of a demulsifying agent comprising a chemical compound which in addition to being of the water softening type is of the formula type:

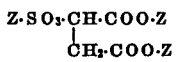

in which Z represents an ionizable hydrogen atom, a metallic atom, an ammonium radical, a substituted ammonium radical, or an organic radical obtained by dehydroxylation of an alcoholiform hydroxyl-containing organic compound, and being further characterized by the fact that the selection of Z at its various occurrences is such as to bring the molecular weight of the chemical compound within the range of 270–2700.

4. A process for breaking a petroleum emulsion of the water-in-oil type which consists in subjecting the emulsion to the action of a demulsifying agent comprising a chemical compound which in addition to being of the water softening type, is of the formula type:

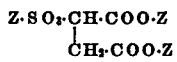

in which all occurrences of Z represent a metallic atom, an ammonium residue, or a substituted ammonium residue and thus being additionally characterized by being in the form of a completely neutralized salt, and being further characterized by the fact that the selection of Z at its various occurrences is such as to bring the molecular weight of the chemical compound within the range of 270–2700.

5. A process for breaking a petroleum emulsion of the water-in-oil type which consists in subjecting the emulsion to the action of a demulsifying agent comprising a chemical compound which in addition to being of the water softening type is of the formula type

in which not more than two occurrences of Z represent an ionizable hydrogen atom and the other occurrence or occurrences of Z represent a metallic atom, an ammonium radical, or a substituted ammonium radical, and thus being additionally characterized by being in the form of an acid salt, and being further characterized by the fact that the selection of Z at its various occurrences is such as to bring the molecular weight of the chemical compound within the range of 270–2700.

6. A process for breaking a petroleum emulsion of the water-in-oil type which consists in subjecting the emulsion to the action of a demulsifying agent comprising a chemical compound within the molecular weight range of 270–2700, being of the water softening type, and of the formula type:

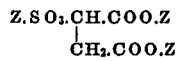

in which at least one occurrence of Z represents an organic radical obtained by dehydroxylation of an alcoholiform hydroxyl-containing organic compound, and the other occurrences of Z represent the same or a metallic atom, an ammonium radical, a substituted ammonium radical, or an ionizable hydrogen atom, and thus being additionally characterized by being in the form of an ester.

7. A process for breaking a petroleum emulsion of the water-in-oil type which consists in subjecting the emulsion to the action of a demulsifying agent comprising a chemical compound within the molecular weight range of 270–2700, being of the water softening type, and of the formula type:

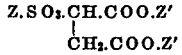

in which at least one occurrence of Z' represents an organic radical derived by dehydroxylation of an alcoholiform hydroxyl-containing organic compound and the other occurrence of Z' and of Z represents the same or a metallic atom, an ammonium radical, a substituted ammonium radical, or an ironizable hydrogen atom, and thus being additionally characterized by being in the form of an ester.

8. A process for breaking a petroleum emulsion of the water-in-oil type which consists in subjecting the emulsion to the action of a demulsifying agent comprising a chemical compound within the molecular weight range of 270–2700, being of the water softening type, and of the formula type:

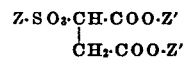

wherein Z is a metallic atom, and at least one occurrence of Z' represents an organic radical derived by dehydroxylation of an alcoholiform hydroxyl-containing organic compound, and the other occurrence of Z' represents the same or a metallic atom, an ammonium radical, a substituted ammonium radical, or an ionizable hydrogen atom, and thus being additionally characterized by being in the form of an ester.

9. A process for breaking a petroleum emulsion of the water-in-oil type which consists in subjecting the emulsion to the action of a demulsifying agent comprising a chemical compound within the molecular weight range of 270–2700, being of the water softening type, and of the formula type:

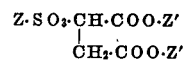

wherein Z is a metallic atom, and at least one occurrence of Z' represents an organic radical obtained by dehydroxylation of an alcoholiform hydroxyl-containing compound; said organic radical being further characterized by the fact that an integral part of the same is an alkylated aromatic sulfonic acid residue, and the other occurrence of Z' being the same, or an ionizable hydrogen atom, a metallic atom, an ammonium radical, a substituted ammonium radical, or an organic radical obtained by dehydroxylation of an alcoholiform hydroxyl-containing organic compound, and thus being additionally characterized by being in the form of an ester.

10. A process for breaking a petroleum emulsion of the water-in-oil type which consists in subjecting the emulsion to the action of a demulsifying agent comprising a chemical compound within the molecular weight range of 270–2700, being of the water softening type, and of the formula type:

wherein Z is a metallic atom, and at least one occurrence of Z' represents an organic radical obtained by dehydroxylation of an alcoholiform hydroxyl-containing compound; said organic radical being further characterized by the fact that an integral part of the same is a petroleum sulfonic acid residue and the other occurrence of Z' being the same, or an ionizable hydrogen atom, a metallic atom, an ammonium radical, a substituted ammonium radical, or an organic radical obtained by dehydroxylation of an alcoholiform hydroxyl-containing organic compound, and thus being additionally characterized by being in the form of an ester.

11. A process for breaking a petroleum emulsion of the water-in-oil type which consists in subjecting the emulsion to the action of a demulsifying agent comprising a chemical compound within the molecular weight range of 270–2700, being of the water softening type, and of the formula type:

wherein Z is a metallic atom, and at least one occurrence of Z' represents an organic radical obtained by dehydroxylation of an alcoholiform hydroxyl-containing compound; said organic radical being further characterized by the fact that an integral part of the same is a detergent-forming monocarboxy acid residue, and the other occurrence of Z' being the same, or an ionizable hydrogen atom, a metallic atom, an ammonium radical, a substituted ammonium radical, or an organic radical obtained by dehydroxylation of an alcoholiform hydroxyl-containing organic compound, and thus being additionally characterized by being in the form of an ester.

12. A process for breaking a petroleum emulsion of the water-in-oil type which consists in subjecting the emulsion to the action of a demulsifying agent comprising a chemical compound within the molecular weight range of 270–2700, being of the water softening type, and of the formula type:

wherein Z is a metallic atom, and at least one occurrence of Z' represents an organic radical obtained by dehydroxylation of an alcoholiform hydroxyl-containing compound; said organic radical being further characterized by the fact that an integral part of the same is an abietic acid residue, and the other occurrence of Z' being the same, or an ionizable hydrogen atom, a metallic atom, an ammonium radical, a substituted ammonium radical, or an organic radical obtained by dehydroxylation of an alcoholiform hydroxyl-containing organic compound, and thus being additionally characterized by being in the form of an ester.

13. A process for breaking a petroleum emulsion of the water-in-oil type which consists in subjecting the emulsion to the action of a demulsifying agent comprising a chemical compound within the molecular weight range of 270–2700, being of the water softening type, and of the formula type:

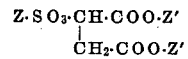

wherein Z is a metallic atom, and at least one occurrence of Z' represents an organic radical obtained by dehydroxylation of an alcoholiform hydroxyl-containing compound; said organic radical being further characterized by the fact that an integral part of the same is a naphthenic acid residue, and the other occurrence of Z' being the same, or an ionizable hydrogen atom, a metallic atom, an ammonium radical, a substituted ammonium radical, or an organic radical obtained by dehydroxylation of an alcoholiform hydroxyl-containing organic compound, and thus being additionally characterized by being in the form of an ester.

14. A process for breaking a petroleum emulsion of the water-in-oil type which consists in subjecting the emulsion to the action of a demulsifying agent comprising a chemical compound within the molecular weight range of 270–2700, being of the water softening type, and of the formula type:

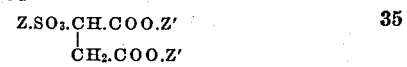

wherein Z is a metallic atom, and at least one occurrence of Z' represents an organic radical obtained by dehydroxylation of an alcoholiform hydroxyl-containing compound; said organic radical being further characterized by the fact that an integral part of the same is a fatty acid residue, and the other occurrence of Z' being the same, or an ionizable hydrogen atom, a metallic atom, an ammonium radical, a substituted ammonium radical, or an organic radical obtained by dehydroxylation of an alcoholiform hydroxyl-containing organic compound, and thus being additionally characterized by being in the form of an ester.

15. A process for breaking a petroleum emulsion of the water-in-oil type which consists in subjecting the emulsion to the action of a demulsifying agent comprising a chemical compound within the molecular weight range of 270–2700, being of the water softening type, and of the formula type:

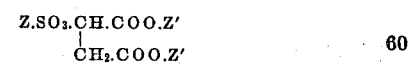

wherein Z is a metallic atom, and at least one occurrence of Z' represents an organic radical obtained by dehydroxylation of an alcoholiform hydroxyl-containing compound; said organic radical being further characterized by the fact that an integral part of the same is a hydroxylated fatty acid residue, and the other occurrence of Z' being the same, or an ionizable hydrogen atom, a metallic atom, an ammonium radical, a substituted ammonium radical, or an organic radical obtained by dehydroxylation of an alcoholiform hydroxyl-containing organic compound, and thus being additionally characterized by being in the form of an ester.

16. A process for breaking a petroleum emulsion of the water-in-oil type which consists in subjecting the emulsion to the action of a demulsifying agent comprising a chemical compound within the molecular weight range of 270–2700, being of the water softening type, and of the formula type:

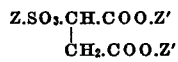

wherein Z is a metallic atom, and at least one occurrence of Z' represents an organic radical obtained by dehydroxylation of an alcoholiform hydroxyl-containing compound; said organic radical being further characterized by the fact that an integral part of the same is a ricinoleic acid residue, and the other occurrence of Z' being the same, or an ionizable hydrogen atom, a metallic atom, an ammonium radical, a substituted ammonium radical, or an organic radical obtained by dehydroxylation of an alcoholiform hydroxyl-containing organic compound, and thus being additionally characterized by being in the form of an ester.

17. A process for breaking a petroleum emulsion of the water-in-oil type which consists in subjecting the emulsion to the action of a demulsifying agent comprising a chemical compound within the molecular weight range of 270–2700, being of the water softening type, and of the formula type:

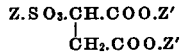

wherein Z is a metallic atom, and at least one occurrence of Z' represents an organic radical obtained by dehydroxylation of an alcoholiform hydroxyl-containing compound; said organic radical being further characterized by the fact that an integral part of the same is a ricinoleic acid residue and a glycerol residue, and the other occurrence of Z' being the same, or an ionizable hydrogen atom, a metallic atom, an ammonium radical, a substituted ammonium radical, or an organic radical obtained by dehydroxylation of an alcoholiform hydroxyl-containing organic compound, and thus being additionally characterized by being in the form of an ester.

18. A process for breaking a petroleum emulsion of the water-in-oil type which consists in subjecting the emulsion to the action of a demulsifying agent comprising a chemical compound within the molecular weight range of 270–2700, being of the water softening type, and of the formula type:

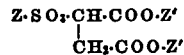

wherein Z is a metallic atom, and at least one occurrence of Z' represents an organic radical obtained by dehydroxylation of an alcoholiform hydroxyl-containing compound; said organic radical being further characterized by the fact that an integral part of the same is a ricinoleic acid residue, a glycerol residue, and phthalic acid residue, and the other occurrence of Z' being the same, or an ionizable hydrogen atom, a metallic atom, an ammonium radical, a substituted ammonium radical, or an organic radical obtained by dehydroxylation of an alcoholiform hydroxyl-containing organic compound, and thus being additionally characterized by being in the form of an ester.

19. A process for breaking a petroleum emulsion of the water-in-oil type which consists in subjecting the emulsion to the action of a demulsifying agent comprising a chemical compound within the molecular weight range of 270–2700, being of the water softening type, and of the formula type:

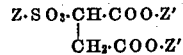

wherein Z is a sodium atom, and at least one occurrence of Z' represents an organic radical obtained by dehydroxylation of an alcoholiform hydroxyl-containing compound; said organic radical being further characterized by the fact that an integral part of the same is a ricinoleic acid residue, a glycerol residue, and a phthalic acid residue, and the other occurrence of Z' being the same, or an ionizable hydrogen atom, a metallic atom, an ammonium radical, a substituted ammonium radical, or an organic radical obtained by dehydroxylation of an alcoholiform hydroxyl-containing organic compound, and thus being additionally characterized by being in the form of an ester.

20. A process for breaking a petroleum emulsion of the water-in-oil type which consists in subjecting the emulsion to the action of a demulsifying agent comprising a chemical compound within the molecular weight range of 270–1700, being of the water softening type, and of the formula type:

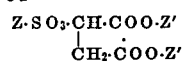

wherein Z is a sodium atom, and at least one occurrence of Z' represents an organic radical obtained by dehydroxylation of an alcoholiform hydroxyl-containing compound; said organic radical being further characterized by the fact that an integral part of the same is a ricinoleic acid residue, a glycerol residue, and a phthalic acid residue, and the other occurrence of Z' being the same, or an ionizable hydrogen atom, a metallic atom, an ammonium radical, a substituted ammonium radical, or an organic radical obtained by dehydroxylation of an alcoholiform hydroxyl-containing organic compound, and thus being additionally characterized by being in the form of an ester.

MELVIN DE GROOTE.
BERNHARD KEISER.